Oct. 1, 1929.   A. J. MOTTLAU   1,729,792
TELEFOCUS CAMERA
Original Filed Dec. 28, 1922   2 Sheets-Sheet 1
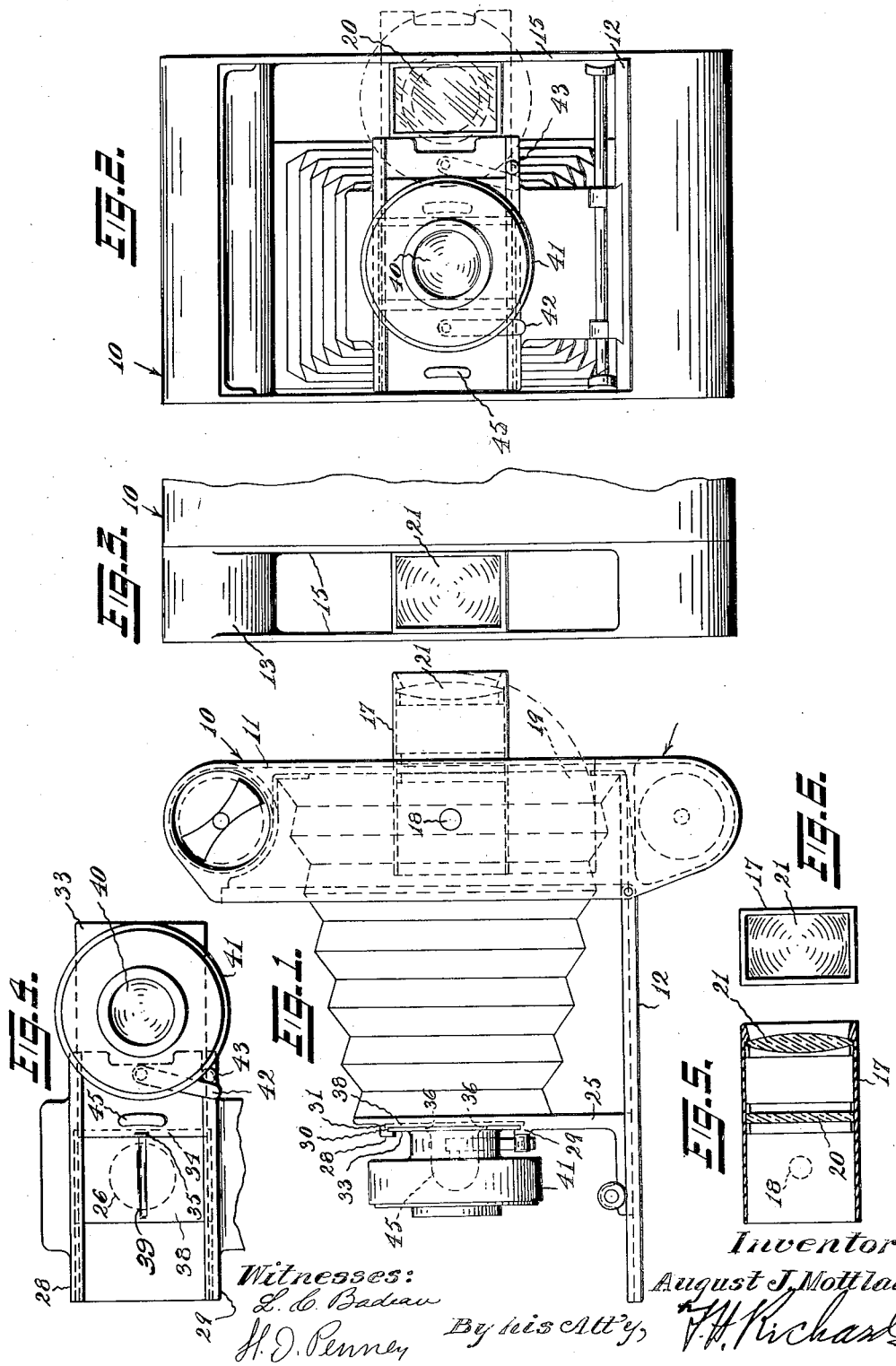

Oct. 1, 1929.   A. J. MOTTLAU   1,729,792
TELEFOCUS CAMERA
Original Filed Dec. 28, 1922   2 Sheets-Sheet 2
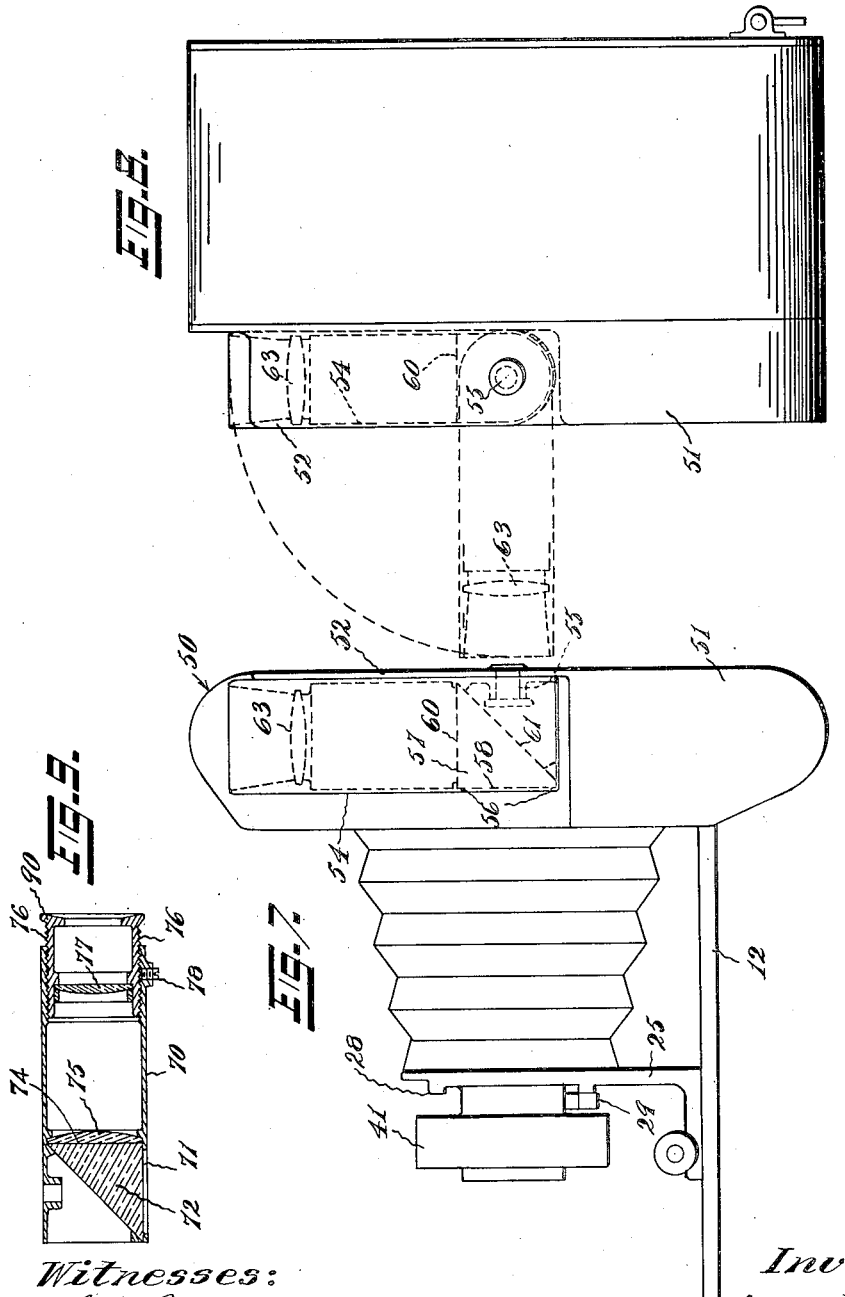

Patented Oct. 1, 1929

1,729,792

UNITED STATES PATENT OFFICE

AUGUST J. MOTTLAU, OF PITTSBURGH, PENNSYLVANIA

TELEFOCUS CAMERA

Application filed December 28, 1922, Serial No. 609,441. Renewed December 13, 1928.

This invention relates to focusing devices for cameras and has for its object to provide a compact easily constructed focusing device using the same objective that the camera uses.

Other objects are to provide a focusing device which may be easily viewed with the eye close to the finder, and also to avoid the use of light excluding bellows either behind the focusing device or between the focusing device and the lens.

Another object is to provide a telescope finder obviating the use of a ground glass and adapted to be adjusted to the eye of the individual operator.

Other objects of the invention will appear as the description proceeds, and while herein minute details of the invention are described, the invention is not limited to these, since many and various changes may be made without departing from the scope of the invention as claimed.

In the accompanying drawings, showing by way of example, two of many possible embodiments of the invention, Figure 1 is a side elevation of the camera embodying my improved focusing device;

Fig. 2 is a front elevation of the camera adjusted for making exposures;

Fig. 3 is a fragmentary rear elevation of the camera adjusted for focusing;

Fig. 4 is a fragmentary front elevation of the camera lens bracket adjusted for focusing;

Fig. 5 is a horizontal sectional view of the focusing device;

Fig. 6 is a rear elevation of the focusing device;

Fig. 7 is a side elevation of a camera embodying another form of my invention, a focusing device being shown in closed position;

Fig. 8 is a rear elevation of the camera of Fig. 7; and

Fig. 9 is a longitudinal sectional view of another form of focusing device.

The embodiment of my invention shown in Figs. 1 to 6 comprises a camera-box 10 adapted to hold a sensitive film 11 in the focal plane of the camera, and provided with a hinged bed 12 and a housing extension 13 providing spaced walls 15 at one side of the camera-box.

An elongated housing 17 is pivotally mounted, as at 18, at its inner end portion between said walls 15 for pivotal movement parallel to said walls, from a position shown in dotted lines, entirely within the housing extension to a position projecting rearwardly from said housing extension perpendicular to said focal plane, as shown by the full lines of Fig. 1. A ground glass 20 (Fig. 5) transversely disposed in said focusing housing lies, when said housing is rearwardly projected as in Fig. 1, in said focal plane of said sensitive film 11. A magnifying lens 21 is disposed in the rear part of said focusing housing for the easy viewing of an image on the ground glass with the eye near the lens, thus avoiding the need of a focusing cloth or other light-excluding means, behind the focusing device.

A lens bracket 25, Fig. 1, slidable on said bed 12 and into the camera-box, is provided with an exposure opening 26 (Fig. 4), and on both sides of said opening with transverse guide-ribs 28 and 29 each grooved to form a lens board guide-way 30 (Fig. 1) and a cover-board guide-way 31 just behind the lens-board guide-way. A lens board 33 slidable in said lens board guide-way parallel to said focal-plane has a laterally extended side 34 (Fig. 4) having an inward projection 35, said board being also provided with a lens opening 36 (Fig. 1) adapted to aline with said exposure opening 26 when the lens board is in exposure position of its movement (Fig. 2), and to aline with said focusing housing when said lens is in focusing position (Fig. 4) and the focusing housing is rearwardly projected (Fig. 1).

A cover board 38 (Fig. 4) in said cover-board guideways 31 between said lens board and said bracket is provided with an elongated depression 39 longitudinal to the path of movement of the lens board adapted to receive said projection 35, thereby to draw said cover board over the exposure opening when said lens opening alines with the focusing housing, as in Fig. 4, and to draw said cover board away from said exposure opening when the lens opening alines with the exposure opening (Fig. 2).

A lens 40 mounted on said lens board in front of said lens opening is provided with a normally closed shutter 41 having an operating lever 42 adapted to engage a lug 43 on the lower guide rib 29 of the lens bracket and to open said shutter when said lens is alined with said focusing housing, thereby to permit focusing on the ground glass 20.

A projecting handle 45 (Fig. 4) on the lens board 33 permits easy shifting of the lens from focusing or exposing position.

The operation of the camera is very simple. When the camera is not in use, the focusing housing 17 is moved to the position of the dotted lines of Fig. 1, and the lens is moved to the position of Fig. 2, whereupon the camera may be closed in the ordinary way. To use the new focuser, the housing 17 is pivotally moved to the position of Fig. 1, and the lens is moved to the position of Fig. 4, drawing with it the cover board over the exposure opening, whereupon the lever 42 engages the lug 43 and opens the shutter, permitting the image to be formed on the ground glass 20. The lens bracket 25 is then moved upon the bed 12 until proper focus is obtained, after which the lens is moved to the position of the full lines of Fig. 2, and the exposure made in the ordinary way.

In the embodiment shown in Figs. 7 and 8, the camera box 50 is provided with a lateral extension at one end of its side and comprises an extension wall 51 extending along the major portion of said side in the plane of the rear wall 52 of the box.

A focusing housing 54 is pivoted as at 55 to said extension wall 52 near the middle part of said side of the camera-box, for movement parallel to the focal plane, and is provided with a lateral opening 56 opening toward the front of the camera.

A right-angular prism 57 in the inner end of said box, has one of its right-angular faces 58 disposed in said opening 56, and its other right-angular face 60 ground and disposed transverse to said focusing housing. The typotenuse face 61 of said prism serves to reflect against said face 60, light coming from in the front of the camera.

A lens 63 in the outer end of said focusing housing is adapted to permit easy viewing of the image on said ground face 60 when the eye is held close to said lens.

The camera lens used in this form is the same as in Figs. 1 to 6, and is movable parallel to the focal plane and adapted to be alined either with the exposure opening 26 or with said lateral opening 56 of the focusing housing, thereby to reflect the image upon the ground face 60.

When not in use the housing 54 is folded against the camera as in Fig. 2. In use it is placed perpendicular to the camera-box 50, Figs. 7 and 8, if horizontal pictures are desired and against the camera box when vertical or high pictures are wanted, the operations relative to the lens being the same as described of Figs. 1 to 6.

In place of either of the above focusing devices, the telescopic focusing device shown in Fig. 9 may be substituted. This device is carried in a housing 70 pivoted at the side of the camera for movement parallel to the focal plane, as in the device of Fig. 7. The outer end of the housing is interiorly threaded and the inner end is provided with an opening toward the front of the camera.

The right angular reflecting prism 72, in the inner end of the housing with one right-angular face in said opening, has a clear right-angular face 74 transverse to the housing in an equivalent of the focal plane of the camera. A clear plano-convex lens 75 has its flat face resting against said rear face 74.

An exteriorly threaded focusing tube 76 adjustably engaged in said outer end of the housing has preferably a plano-convex lens 77 in its outer end with its flat face out.

When the lens 40 has its equivalent focus in the focal plane of the camera, the tube 76 is adjusted by the operator until the image, which is formed at the flat face of the lens 75 is sharp. The set screw 78 is then tightened and the focusing device is set for that particular operator, and may be used, as explained of Fig. 7, for all distances, merely by looking in at the eye-piece 90 and adjusting the lens 40 until a clear image is obtained.

Obviously this lens arrangement could be used in place of the device of Fig. 5, in which case, the lens 75 would occupy the place of the ground glass 20.

Focusing devices such as herein illustrated have many uses besides those shown, and are not limited to use with cameras or photographic devices.

I claim as my invention:

1. In combination, a camera having a lens; and a focusing device on the camera; said device being movable in a plane parallel to the focal plane to assume a plurality of focusing positions, and said lens being movable relative to said device whereby an image may be formed by the lens in said device or camera at will.

2. A camera adapted to hold a sensitive medium and having a supplemental screen and a lens, said lens and screen being movable in a plane parallel to the focal plane and having relative movement, whereby the image from the lens may be thrown on said medium or said screen.

3. In combination, a camera; a focusing device mounted on the camera; a lens support having an exposure opening; a lens slidable on said support adapted to aline with said exposure opening or said focusing device; and a cover slidable on a guideway and in a path of movement parallel to the path of movement of said lens to be drawn over the exposure opening when the lens alines with the focusing device and to be drawn away from said exposure opening when the lens alines with the exposure opening.

4. In combination, a camera; a focusing device mounted on the camera; a lens bracket having an exposure opening; a lens slidable on said bracket and adapted to be alined with said exposure opening or with said focusing device; a cover board slidable on a guideway and in a path of movement parallel to the path of movement of said lens between said lens board and said bracket; and means adapted to draw said cover board over the exposure opening, and to draw said cover board away from said exposure opening when the lens alines with the exposure opening.

5. In combination, a camera; a focusing device mounted on one side of the camera; a lens bracket having an exposure opening; a lens board slidable on said bracket and having at one side an inward projection, said board being provided with a lens-opening adapted to aline with said exposure opening when the lens board is in one position of its movement and said device when in another position; a cover board slidable between said lens board and said bracket and provided with an elongated depression adapted to receive said inward projection of the lens board thereby to draw said cover board over the exposure opening, and to draw said cover board away from said exposure opening when the lens opening alines with the exposure opening; and a lens mounted on said lens board in front of said lens opening and adapted to aline with said exposure opening or said focusing device.

6. In combination, a camera box; a focusing device mounted on one side of the camera box; an adjustable lens-bracket provided with an exposure opening and with transverse lens board guide-ways and cover board guide-ways; a lens board slidable in said lens board guide-way parallel to said focal plane and having at one side an inward projection, a lens on said board and adapted to aline with said box when the lens board is in one position of its movement, and to aline with said focusing device when said lens is in another position of movement; a cover board in said cover-board guide-ways between said lens board and said bracket and provided with an elongated depression longitudinal to the path of movement of the lens board and adapted to receive said inward projection of the lens board; a lug on the lower guide-rub of the lens bracket; and a normally closed lens shutter mounted on said lens and provided with an operating lever adapted to engage said lug and open said shutter when said lens is alined with said focusing device.

7. In combination, a camera box having a bed; a focusing device mounted on one side of the camera box and in the focal plane of the camera; a lens bracket slidable on said bed and into the camera box and provided in its upper middle part with an exposure opening, and on both sides of said opening with transverse guide-ribs each grooved to form a lens board guide-way and a cover board guide-way just behind the lens guide-way; a lens board slidable in said lens board guide-way parallel to said focal plane and having a laterally extended side having an inward projection, said board being provided with a lens opening adapted to aline with said exposure opening when the lens board is in one position of its movement, and to aline with said focusing device when said lens is in another position of movement; a cover board in said cover-board guide-ways between said lens board and said bracket and provided with an elongated depression longitudinal to the path of movement of the lens board and adapted to receive said inward projection of the lens board thereby to draw said cover board over the exposure opening when said lens opening alines with the focusing housing, and to draw said cover board away from said exposure opening when the lens opening alines with the exposure opening; a lug on the lower guide rib of the lens bracket; a lens mounted on said lens board in front of said lens opening and provided with a normally closed lens shutter having an operating lever adapted to engage said lug on the lens bracket and open said shutter when said lens opening is alined with said focusing device.

8. In combination, a camera, a focusing device; and a lens moveable into two positions, one position to form an image in the camera, and the other position to form an image in the device; the major portion of the space between said lens and device being laterally open.

9. In a camera, an inner lens; a focusing lens behind the inner lens; and a lens for said camera in front of said inner lens to form an image on said inner lens.

10. In combination, an inner clear plano-convex lens having its flat face disposed forwardly; a focusing lens adjustably mounted to the rear of said inner lens; means for locking said focusing lens in adjustment; and a lens in front of said inner lens adapted to form an image at said flat face of the inner lens.

11. In a camera, an inner lens; an adjustable focusing lens to the rear of the inner lens; and a lens for said camera in front of said inner lens to form an image at the front face of the inner lens.

12. In a camera, a housing; an inner clear plano-convex lens having its flat face disposed forwardly transverse to the axis of the housing in an equivalent focal plane of the camera; a focusing tube adjustably engaged in the outer end of the housing; a plano-convex lens in the outer end of said tube with its flat face out; and a lens for said camera adapted to form an image as said flat face of the inner lens.

13. In combination, a camera box; a housing pivoted at the side of the camera for movement parallel to the focal plane and having its outer end interiorly threaded the inner end being provided with an opening toward the front of the camera; a right angular reflecting prism in the inner end of the housing with one right angular face in said opening and a clear rear right angular face transverse to the housing in an equivalent focal plane of the camera; a clear plano-convex lens having its flat face against said rear face; an exteriorly threaded focusing tube adjustably engaged in said outer end; a plano-convex lens in the outer end of said tube with its flat face out; and a lens for said camera adapted to be alined with said camera box or with said lateral opening.

14. In a camera, a photographic objective; and an image receiving combination of lenses movable in a path of movement parallel to the focal plane of said photographic objective.

15. In a camera, a photographic objective; a combination of lenses movably mounted and having an image receiving lens face, said lens face, during such movement, remaining in the focal plane of said photographic objective.

16. In a camera, a photographic objective; a combination of lenses movably mounted and having an image receiving lens face, said lens face, during such movement, remaining in the focal plane of said photographic objective, and adjustable for different eyesights.

17. In a camera, a photographic objective; a combination of lenses movably mounted and having an image receiving lens face, said lens face, during such movement, remaining in the focal plane of said objective; and means to adjust said combination for different eyesights.

18. In a camera, a photographic objective; a combination of lenses movably mounted and having an image receiving lens face, said lens face adapted to receive an image in the focal plane of said objective; and means to relatively adjust said lenses for different eyesights.

19. In a camera, a photographic objective; a combination of lenses movably mounted and having an image receiving lens face, said lens face adapted to receive an image in the focal plane of said objective; and means to adjust one lens of said combination for viewing said image with eyes of different focus.

20. In a camera, a photographic objective; an image receiving lens movably mounted in the focal plane of said objective; and a lens in focus with the image receiving lens.

21. In a camera, a photographic objective, a plano-convex image receiving lens movably mounted in the focal plane of said objective; and a lens in focus with the image receiving lens.

22. In a camera, a photographic objective, a plano-convex image receiving lens movably mounted to assume different positions relative to the camera but in a single plane, always to receive an image in the focal plane of said objective; and a lens adjustable to be in focus with said image for viewing the image.

23. In a camera adapted for horizontal or vertical elongated pictures, a focusing device adapted to deflect rays at an angle to the axis of the camera and from an image; said device being adapted to be moved to one position when horizontal pictures are desired and to another position when vertical pictures are desired.

24. In a camera, a focusing device; an objective lens adapted to transmit rays to said device; means on said device adapted to deflect said rays whereupon an image is formed at an equivalent focal plane; and means for viewing said image; said device being adapted to be moved to one position when horizontal pictures are desired and to another position when vertical pictures are desired.

25. In a camera, a focusing device; an objective lens for said camera adapted to transmit rays to said device; means on said device adapted to deflect rays from said objective lens whereupon an image is formed at an equivalent focal plane at an angle to the focal plane of the camera; and means on said device for viewing said image; said device being adapted to be moved to one position when horizontal pictures are desired and to another position when vertical pictures are desired.

26. In a camera adapted for horizontal or vertical elongated pictures, a focusing device; an objective lens for said camera adapted to transmit rays to said camera or said device; a reflector on said device adapted to reflect rays from said objective lens whereupon an image is formed at an equivalent focal plane; and a lens on said device for viewing said image; said device being adapted to be moved to one position when horizontal pictures are desired and to another position when vertical pictures are desired.

27. In a camera adapted for horizontal or vertical elongated pictures, a focusing device mounted on the camera for movement parallel to the focal plane of the camera; an objective lens for said camera adapted to be alined with said camera or with said device; a reflector on said device adapted to receive light rays from said objective lens when the latter is alined with said device and thereby to bend the axial rays thereof substantially right angularly whereby an image is formed at an equivalent focal plane; and a lens for viewing said image; said device being adapted to be moved to one position when horizontal pictures are desired and at right angles to said position against the box when vertical pictures are desired.

28. In a camera adapted for horizontal or vertical elongated pictures, a focusing device pivoted at the side of the camera for movement parallel to the focal plane of the camera; an objective lens for said camera adapted to be alined with said camera or with said device; a reflector on said device adapted to receive light rays from said objective lens when the latter is alined with said device and thereby to bend the axial rays substantially right angularly whereby an image is formed at right angles to the normal focal plane of the camera; a clear image receiving lens adapted to receive said image; and a focusing lens on said device for viewing said image and adjustable for different eyesights; said device being adapted to be moved to a position perpendicular to the camera box when horizontal pictures are desired and against the box when vertical pictures are desired.

29. In a camera adapted for horizontal or vertical elongated pictures, a focusing device pivoted at the side of the camera for movement parallel to the focal plane and provided at its inner end with a right angular reflecting prism with a forward right angular forwardly disposed and a clear right angular rear face transverse to the device in an equivalent focal plane of the camera; an objective lens for said camera adapted to be alined with said camera box or with said forward face, a clear image receiving lens against said rear face in the focal plane of said objective lens; and a focusing lens in said device adjustable to be in focus with the image of said image receiving lens; said device being adapted to be moved to a position perpendicular to the camera box when horizontal pictures are desired and at right angles to said position against the box when vertical pictures are desired.

30. In a camera adapted for horizontal or vertical elongated pictures, a housing pivoted on the camera for movement parallel to the focal plane and provided at its inner end with an opening toward the front of the camera, said housing being adapted to be moved to a position perpendicular to the camera when horizontal pictures are desired and against the box when vertical pictures are desired; a right angular reflecting prism in the inner end of the housing with one right angular face in said opening and a clear rear face transverse to the housing; an objective lens for said camera adapted to be alined with said camera box or with said opening; a clear image receiving lens against said rear face in the focal plane of said objective lens; and a focusing lens adjustable in said housing in focus with the image of said image receiving lens.

31. In a camera adapted for horizontal or vertical elongated pictures, a camera box; a housing pivoted at the side of the camera box for movement parallel to the focal plane and provided at its inner end with an opening toward the front of the camera, said housing being adapted to be moved to a position perpendicular to the camera box when horizontal pictures are desired and against the box when vertical pictures are desired; a right angular reflecting prism in the inner end of the housing with one right angular face in said opening and a clear right angular rear face transverse to the housing in the equivalent focal plane of the camera; an objective lens for said camera adapted to be alined with said camera box or with said opening; a clear image receiving lens against said rear face, in a focal plane of said objective lens; a focusing tube adjustably engaged in the outer end of said housing; and a plano-convex lens in the outer end of said tube in focus with the image of said image receiving lens.

AUGUST J. MOTTLAU.